United States Patent
Boerema et al.

(10) Patent No.: US 11,589,524 B2
(45) Date of Patent: Feb. 28, 2023

(54) AQUEOUS GROW CHAMBER RECIRCULATING NUTRIENT CONTROL SYSTEM AND SENSOR CALIBRATION

(71) Applicant: Local Urban Vegetables, LLC, Whittier, CA (US)

(72) Inventors: Martin Boerema, Whittier, CA (US); Morris Gasmer, Whittier, CA (US); Geoffrey C. Landis, Whittier, CA (US)

(73) Assignee: Proterra Ag, Inc., Commerce, CA (US)

( * ) Notice: Subject to any disclaimer, the term of this patent is extended or adjusted under 35 U.S.C. 154(b) by 238 days.

(21) Appl. No.: 17/062,363

(22) Filed: Oct. 2, 2020

(65) Prior Publication Data
US 2021/0227762 A1    Jul. 29, 2021

Related U.S. Application Data

(63) Continuation of application No. 16/044,209, filed on Jul. 24, 2018, now abandoned.

(60) Provisional application No. 62/536,372, filed on Jul. 24, 2017.

(51) Int. Cl.
*A01G 31/00* (2018.01)
*A01G 27/00* (2006.01)

(52) U.S. Cl.
CPC ........... *A01G 31/00* (2013.01); *A01G 27/003* (2013.01); *A01G 2031/006* (2013.01)

(58) Field of Classification Search
CPC ...... A01G 31/00; A01G 31/02; A01G 27/005; A01G 27/006
See application file for complete search history.

(56) References Cited

U.S. PATENT DOCUMENTS

| | | | |
|---|---|---|---|
| 5,545,303 A * | 8/1996 | Schasfoort | G01N 27/4473 204/451 |
| 5,598,663 A | 2/1997 | Kikuchi | |
| 10,436,749 B2 | 10/2019 | Sankaran et al. | |
| 10,928,229 B2 | 2/2021 | Sankaran et al. | |
| 2008/0115245 A1 * | 5/2008 | Chen | A01G 31/02 800/298 |

(Continued)

FOREIGN PATENT DOCUMENTS

| | | | |
|---|---|---|---|
| CA | 2985824 A1 * | 11/2016 | ............ C05C 5/00 |
| CA | 2985824 A1 | 11/2016 | |

(Continued)

OTHER PUBLICATIONS

Price System specification for Compact Multi-Channel, Multi-Parameter Monitoring Systems, EAI Electro Analytical Instruments, http://www.eainstruments.com/Products/MCC/MCC-spec.htm#Hardware, May 2015.

(Continued)

*Primary Examiner* — Kristen C Hayes
(74) *Attorney, Agent, or Firm* — KOS IP Law LLP

(57) ABSTRACT

An aquaponic grow system includes a plurality of sensors for sensing nutrient levels in liquid provided to a grow chamber, and to adjust nutrient levels based on the sensed levels. In some embodiments the system includes a plurality of sensors configured to sense nutrient levels in a common chamber, with the system configured to calibrate the sensors.

19 Claims, 7 Drawing Sheets

(56) References Cited

U.S. PATENT DOCUMENTS

| | | |
|---|---|---|
| 2010/0286833 A1 | 11/2010 | Kaprielian |
| 2014/0165713 A1 | 6/2014 | Frey |
| 2016/0050862 A1 | 2/2016 | Walliser |
| 2017/0035002 A1 | 2/2017 | Ellins et al. |
| 2018/0132434 A1* | 5/2018 | Fu .......................... A01G 31/02 |

FOREIGN PATENT DOCUMENTS

| | | |
|---|---|---|
| CN | 2807765 Y | 8/2006 |
| CN | 101422124 A | 5/2009 |
| CN | 102100172 A | 6/2011 |
| CN | 103960114 A | 8/2014 |
| CN | 205794384 U | 12/2016 |
| GB | 1558581 A | 1/1980 |

OTHER PUBLICATIONS

Compact Multi-Channel, Multi-Parameter Monitoring Systems for pH, ORP, Ions, D.O., http://www.eainstruments.com/Products/MCC/MCC.htm, May 2015.

International Search Report on related PCT Application No. PCT/US2018/043532 from International Searching Authority (KIPO) dated Apr. 29, 2019.

Written Opinion on related PCT Application No. PCT/US2018/043532 from International Searching Authority (KIPO) dated Apr. 29, 2019.

Van Os et al., Technical Equipment in Soilless Production Systems, Soilless Culture: Theory and Practice, 2008, pp. 157-207.

U.S. Appl. No. 16/044,209, filed Jul. 24, 2018, Martin Boerema, Morris Gasmer, Geoffrey C. Landis, US 2019-0021247 A1, Notice of Allowance dated Jul. 2, 2020; Aug. 24, 2020.

ELIT Brand Electrochemical Sensors and Computer-based Instrumentation, http://www.nico2000.net/, Oct. 10, 2019.

Electro Analytical Instruments, http://ww.eainstruments.com/?LMCL=aEnd4r, Jan. 2017.

Extended European Search Report (EESR) on related European Application No. 18837766.7 from the European Patent Office (EPO) dated Mar. 22, 2021.

* cited by examiner

US 11,589,524 B2

AQUEOUS GROW CHAMBER RECIRCULATING NUTRIENT CONTROL SYSTEM AND SENSOR CALIBRATION

CROSS-REFERENCE TO RELATED APPLICATIONS

This application is a continuation of U.S. patent application Ser. No. 16/044,209, filed Jul. 24, 2018, which claims the benefit of the filing date of U.S. Provisional Patent Application No. 62/536,372, filed on Jul. 24, 2017, the disclosures of which are incorporated by reference herein.

BACKGROUND OF THE INVENTION

The present invention relates generally to fertilization and irrigation ("fertigation") systems for crops, and more particularly to fertigation systems for closed-loop aqueous (hydroponic or aeroponic) grown crops and calibration of sensors used in such systems.

Aqueously grown crops generally maintain roots of the crops in an aqueous rich environment, with the roots either in a liquid solution or a mist environment. For example, hydroponically grown crops generally maintain roots of the crops in a liquid solution of water and nutrients. Also for example, aeroponically grown crops generally maintain roots of the crops in an aqueous mist environment, with the mist formed using a liquid solution, and the mist providing water and nutrients for plant growth.

Maintaining an appropriate level of nutrients in the liquid solution may be difficult particularly for a closed-loop system, in which liquid solution injected into a grow chamber is reused in a recirculating manner. For example, the crops may intake different amounts of nutrients from the solution, and this may change over time. Also for example, a large quantity of aqueous solution generally may be present about the crop roots, particularly for hydroponic systems, forming a relatively large reservoir of solution. Injecting nutrients into the solution may result in variations in concentration of the nutrients within the reservoir, and there may be significant delays or time lags between time of injection of the nutrients and dispersal of the nutrients within the reservoir. These delays or time lags may make sampling of the solution for nutrients prone to errors, and increase difficulties in accurate sampling of nutrient levels.

In addition, sensors used for the sampling of the solution may benefit from periodic recalibration. Recalibration of sensors, however, may be a relatively lengthy process, increasing costs and also possibly resulting in excessive time in which sampling is not performed.

BRIEF SUMMARY OF THE INVENTION

Some aspects of the invention relate to fertigation controls for recirculating aqueous crop growing systems. Some aspects of the invention relate to calibration of sensors for fertigation systems, for example for aqueously (hydroponically or aeroponically) grown plants. Some aspects of the invention relate to fertigation systems, for example for hydroponically grown plants. Some aspects of the invention relate to fertigation systems, for example for aeroponically grown plants.

Some embodiments provide a nutrient control system for aquaponically grown plants, comprising: a grow chamber for aquaponically growing plants; a liquid solution line for providing liquid solution to the aquaponically growing plants; a plurality of nutrient tanks containing nutrients coupled to the liquid solution line; a plurality of reference solution tanks containing reference solutions; a chamber selectively coupled to the liquid solution line and to the reference solution tanks; a plurality of sensors for sensing ion levels in solution in the chamber; a controller configured to control addition of the nutrients to the liquid solution based on sensed ion levels in solution in the chamber, configured to perform sensor calibration based on sensed ion levels in solution in the chamber, and to selectively couple the chamber to the liquid solution line or to the reference solution tanks; and a plurality of isolation amplifiers coupling the plurality of sensors and the controller.

Some embodiments provide a method for control of nutrients provided to aquaponically grown crops, comprising: providing a liquid solution containing nutrients to an aeroponic grow chamber; sensing levels of a plurality of ions in the liquid solution containing nutrients using a plurality of sensing devices having portions immersed in a single chamber, the sensing devices coupled to a controller by isolation amplifiers; determining, by the controller, that at least one of the sensing devices indicates a selected ion level below a predetermined selected ion level; responsive to the determination that at least one of the sensing devices indicates the selected ion level below the predetermined selected ion level, commanding, by the controller, an increase in a selected nutrient; responsive to the command by the controller to increase the selected nutrient, increasing a quantity of the selected nutrient in the liquid solution containing nutrients; providing a plurality of reference solutions to the single chamber, each of the plurality of reference solutions being provided to the single chamber at different times; sensing levels of the plurality of ions in the reference solutions using the plurality of sensing devices; and generating calibration curves for the sensing devices, by the controller, using indications of the sensed levels of the plurality of ions in the reference solutions.

These and other aspects of the invention are more fully comprehended upon review of this disclosure.

DETAILED DESCRIPTION

Figure 1:
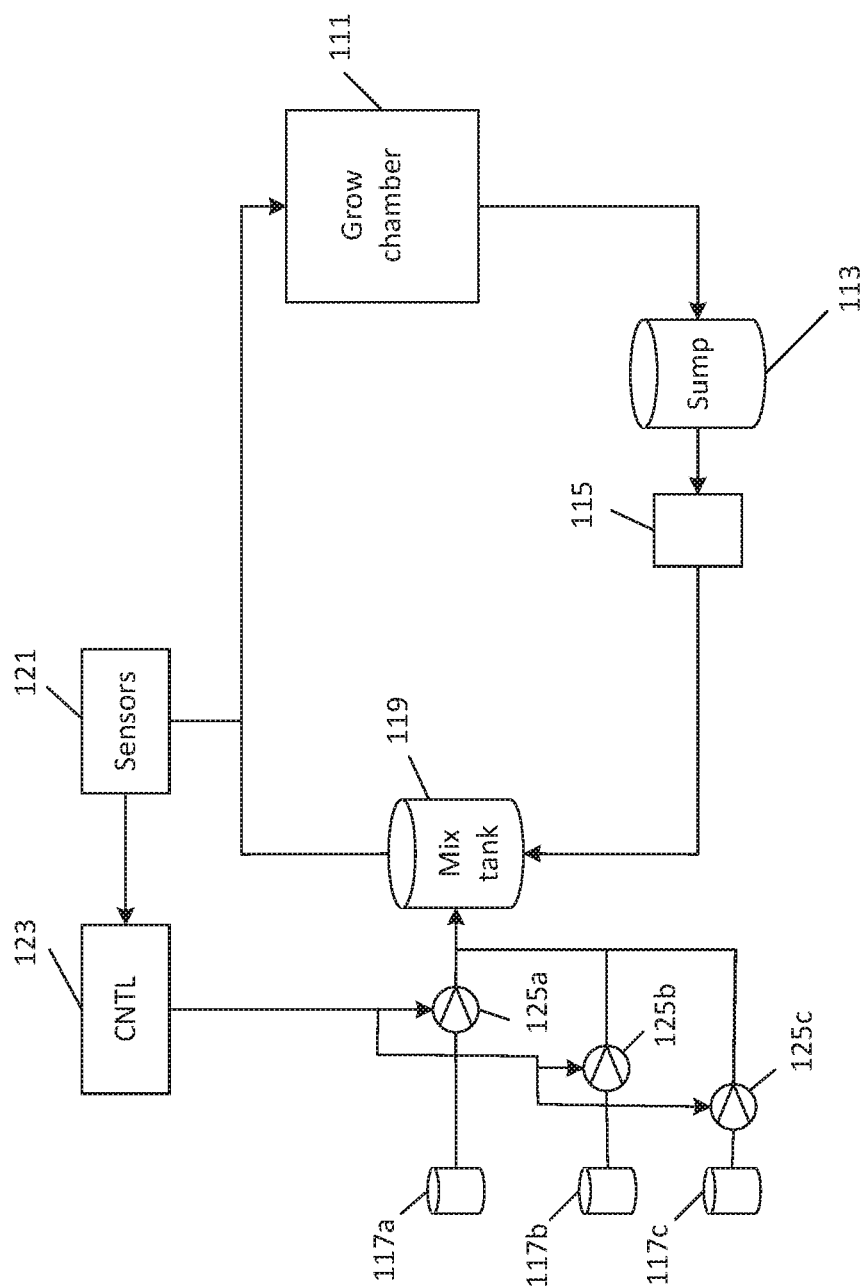
FIG. 1 is a block diagram of an agricultural system in accordance with aspects of the invention.

FIG. 1 is a block diagram of an agricultural system in accordance with aspects of the invention. In some embodiments the agricultural system is an aeroponics system.

The system includes a grow chamber 111. Crops are grown in the grow chamber. In some embodiments individual plants are sprouted outside of the grow chamber, and then grown from sprouts to maturity in the grow chamber. In some embodiments the grow chamber provides for aquaponic growth of the crops. In some embodiments the grow chamber provides for hydroponic growth of plants. In some embodiments the chamber provides for aeroponic growth of plants. In some embodiments the grow chamber includes one or more vertical walls for mounting of plants for aeroponic growth, with an aqueous mist provided within the grow chamber, for example by way of misting nozzles. In some embodiments grow chamber is as discussed in U.S. patent application Ser. No. 15/360,876, entitled PLANT GROWING SYSTEMS AND METHODS and filed with the United States Patent and Trademark Office on Nov. 23, 2016, the disclosure of which is incorporated by reference for all purposes.

The grow chamber receives a liquid solution. In some embodiments roots of the crops are immersed in the liquid solution. In some embodiments the liquid solution is used to generate a mist, with the mist generally enveloping roots of the plants. The liquid solution generally includes water and plant nutrients. Liquid from the grow chamber, which if a mist precipitates, liquid collects in a sump 113. The sump may be at or towards a bottom of the grow chamber, although the sump may be outside of the grow chamber, and may be a separate tank, as illustrated in FIG. 1 for clarity. Liquid from the sump is passed to a cleaning or sanitization unit 115. In some embodiments the sanitization unit cleans or sterilizes the liquid using one or more of a method using one or more chemicals, for example chlorine, a method using ultraviolet light, a method using filters, and/or a method using ozone.

The cleaned or sanitized liquid is combined with nutrients in a mix tank 119. The mix tank allows for mixing of the liquid and the nutrients. In some embodiments preferably the mix tank holds less than 50 gallons of liquid. In some embodiments preferably the mix tank holds less than 40 gallons of liquid. In some embodiments preferably the mix tank holds approximately 4 gallons of liquid. In some embodiments a mixer is used in place of the mix tank, and in some embodiments the mixer is a confluence of two pipes, and in some embodiments the mixer is a mixing valve.

The nutrients, which may also be in aqueous form, are provided by pumps 125a-c. Each of the pumps 125a-c receives nutrients from a separate corresponding nutrient tank 117a-c, respectively, with each of the nutrient tanks generally containing different nutrients, or mixtures of nutrients. The liquid with added nutrients is provided to the grow chamber.

Sensors 121 sense one or more aspects of the liquid provided to the grow chamber. In some embodiments the sensors In some embodiments the sensor may sense, for example, one or more of the pH of the liquid, potassium content of the liquid, magnesium content of the liquid, or other constituents of the liquid.

Levels of nutrients in the liquid provided to the grow chamber are related to the amount of nutrients provided by the pumps. The pumps, and therefore the amount of added nutrients, are controlled by a controller 123. The controller controls the pumps, at least in part, based on information from the sensors 121. In some embodiments the controller comprises at least one processor, which may operate in accordance with program instructions. In some embodiments the controller comprises a personal computer. In some embodiments the controller comprises circuitry including a digital signal processor.

Figure 2:
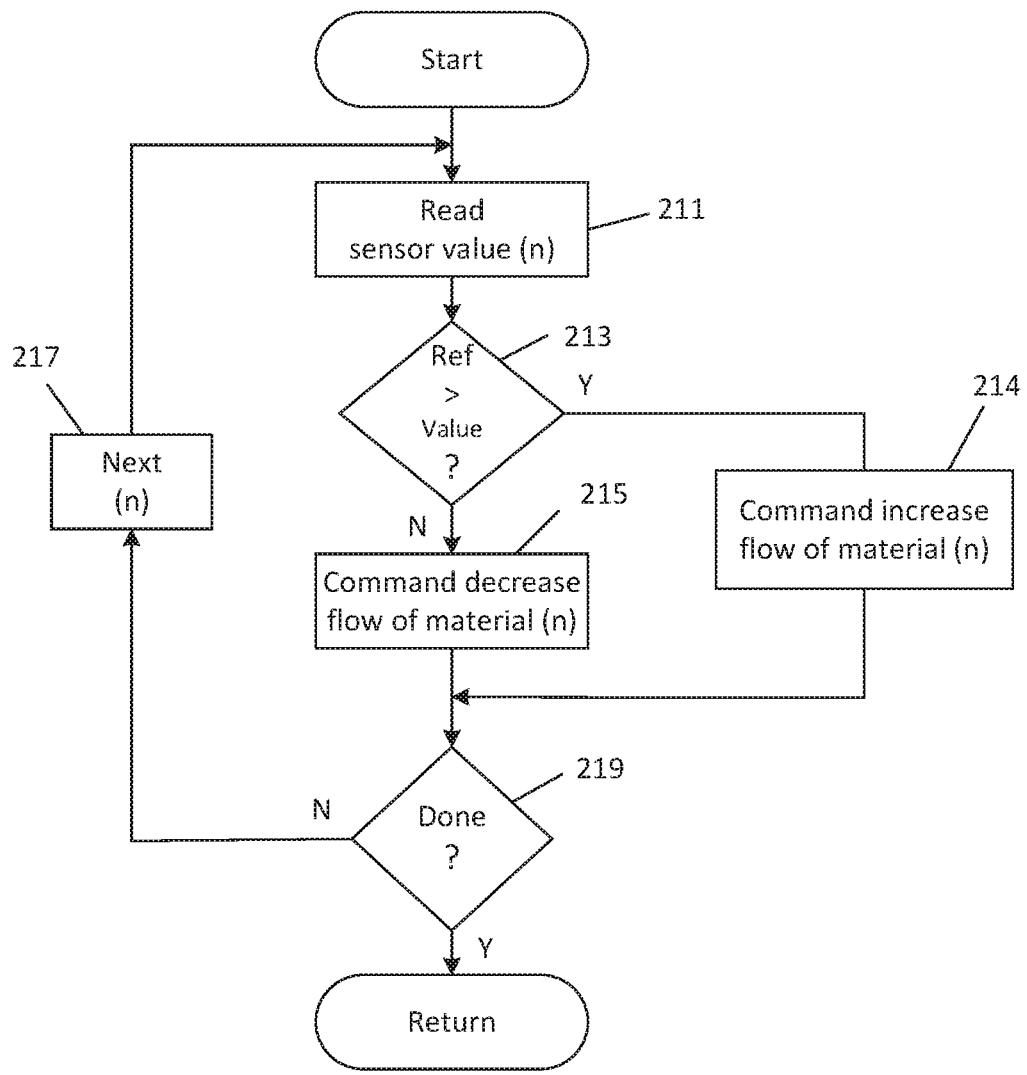
FIG. 2 is a flow diagram of a process for controlling nutrient levels in liquid provided to a grow chamber.

FIG. 2 is a flow diagram of a process for controlling nutrient levels in liquid provided to a grow chamber. In some embodiments the grow chamber is a chamber for aeroponically growing plants, for example crops. In some embodiments the nutrients include some or all of potassium, calcium, sodium, chlorine and/or other elements, which may be in ionic form or in combination with various elements. In some embodiments the process is performed by the system of FIG. 1, or parts of the system of FIG. 1. In some embodiments the process is performed by at least one processor. In some embodiments the processor is coupled, for example by electrical and/or electronic circuitry, to pumps and/or chemical and/or electrochemical sensors.

In block 211 the process reads a value from a sensor. The sensor may be, for example, a sensor as in the system of FIG. 1, with the sensor sensing an aspect of liquid provided to a grow chamber. In various embodiments the sensor is one of a plurality of sensors. For example, in some embodiments the sensor may be one of four sensors, in some embodiments the sensor may be one of eight sensors, or, more generally, the sensor may be one of n sensors, n being an integer greater than one. In some embodiments the sensor is an ion channel sensor. In some embodiments the sensor is an ion selective electrode sensor. In various embodiments at least some of the plurality of sensors are ion selective electrode sensors. In some embodiments all of the plurality of sensors are ion selective electrode sensors.

In block 213 the process determines if the value read from the sensor is less than a reference value. In some embodiments the reference value is indicative of a desired concentration of an ion in the liquid provided to the grow chamber. In some embodiments the reference value is a programmable value, and may be changed from time to time. In some embodiments the process determines if the value read from the reference value is greater than the reference plus a tolerance range, or if the value read from the sensor is less than the reference value minus a tolerance range. In other words, in some embodiments, and in some cases most embodiments, the process determines if the value read from the sensor indicates whether the ion concentration in the liquid is above or below an acceptable ion concentration range.

If the reference value is greater than the value read from the sensor, or in some embodiments if the value read from the sensor indicates a concentration below the acceptable ion concentration range, the process proceeds to block 214. If the reference value is less than the value read from the sensor, or in some embodiments if the value read from the sensor indicates a concentration above the acceptable ion concentration range, the process proceeds to block 215.

If the process proceeds to block 214, in block 214 the process commands an increase in flow of a nutrient n, n being a nutrient corresponding to the ion concentration measured by the sensor n. In some embodiments the process commands a pump to increase pumping of the nutrient. In some embodiments the process commands the pump to pump nutrient at an increased flow rate. In some embodiments the process commands a pump to pump nutrient for a specified period of time, and in some embodiments at a specified flow rate.

If the process proceeds to block 215, in block 215 the process commands a decrease in flow of a nutrient n, n being a nutrient corresponding to the ion concentration measured by the sensor n. In some embodiments the process commands a pump to decrease pumping of the nutrient. In some embodiments the process commands the pump to pump nutrient at a decreased flow rate. In some embodiments the process commands a pump to pump nutrient for a specified period of time, and in some embodiments at a specified flow rate.

In block 219 the process determines if there are more sensors to process. If so, the process proceeds to block 217 and increments n, with the process thereafter beginning processing of the next sensor with operations of block 211 and so on. Otherwise the process returns.

Figure 3:
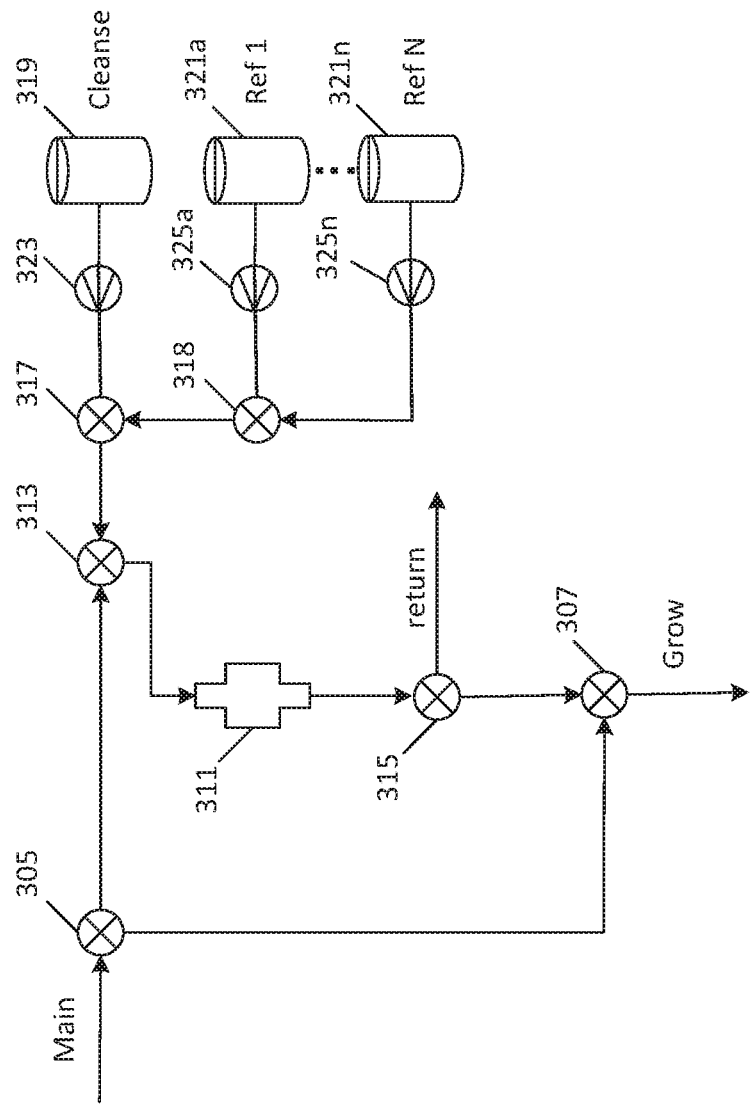
FIG. 3 is a block diagram of components associated with sensing of nutrients in liquid solution provided to a grow chamber in accordance with some embodiments.

FIG. 3 is a block diagram of components associated with sensing of nutrients in liquid solution provided to a grow chamber in accordance with some embodiments. In some embodiments the components are associated with the sensors of the system of FIG. 1.

A flow chamber 311 includes a plurality of sensors for sensing nutrients in the liquid solution. In normal operation liquid solution is provided to the grow chamber and nutrients in the liquid solution are sensed. Accordingly, considering the components of FIG. 3, a main line provides liquid solution for provision to the grow chamber. During normal operation, the liquid solution passes through a first valve 305 and a second valve 313 to the flow chamber, in which levels of the nutrients are sensed by the sensors. Exiting the sensors, again during normal operation, the liquid solution passes through valves 315 and 307 and proceeds to the grow chamber. The configuration for the valves 305, 307, 313, and 315, and the other valves of the embodiment of FIG. 3 are exemplary only. In various embodiments different configurations of valves, in layout, type, and/or number, may be used.

At times, however, calibration of the sensors may be desired. During calibration operations, in accordance with aspects of the invention, valves 305 and 307 are operated, with these and other valves controlled for example by the controller of FIG. 1, such that the liquid solution bypasses the flow chamber. With the liquid solution bypassing the flow chamber, the liquid solution instead flows from the main line into a bypass line connecting valves 305 and 307. In some embodiments, however, a bypass line may not be used, with the flow chamber instead receiving a portion of the flow selectively provided to the flow chamber, and in other embodiments flow of liquid to the grow chamber may be interrupted during calibration.

The flow chamber therefore does not receive liquid solution from the main line during sensor calibration. Instead, during calibration operations, valve 313 is operated such that the flow chamber receives cleansing solution or reference solutions from cleansing solution tank 319 or reference solution tanks 321*a-n*, respectively. In the embodiment of FIG. 3, the solution, after passage through the flow chamber, is directed to a return line by valve 315. The return line returns the solution to the tanks from which it came, in some embodiments, or to a waste container, in other embodiments, or a combination of the two, for example on a tank-by-tank basis.

Each of the reference solution tanks 321*a-n* holds a different reference solution. In some embodiments each reference solution tank holds a reference solution with a different single nutrient of interest. In some embodiments the reference solution tanks may be grouped into subsets, with each subset having a different single nutrient of interest, but with each tank in a subset having a different level of that nutrient. In some embodiments each reference solution tank may hold a solution with a plurality of nutrients of interest, with nutrient levels varying across reference tanks.

A pump is associated with each of the tanks, with a cleansing solution pump 323 providing cleansing solution from the cleansing solution tank and reference solution pumps 325*a-n* providing reference solution from reference solution tanks 321*a-n*. The pumps, like the valves, may be controlled by a controller, for example the controller of the system of FIG. 1. Solution from the tanks selectively, on a tank by tank basis, flows through valves, for example valves 317, 318 connecting lines from the pumps to the valve 313, which is coupled to an inlet of the flow chamber 311.

Figure 4:
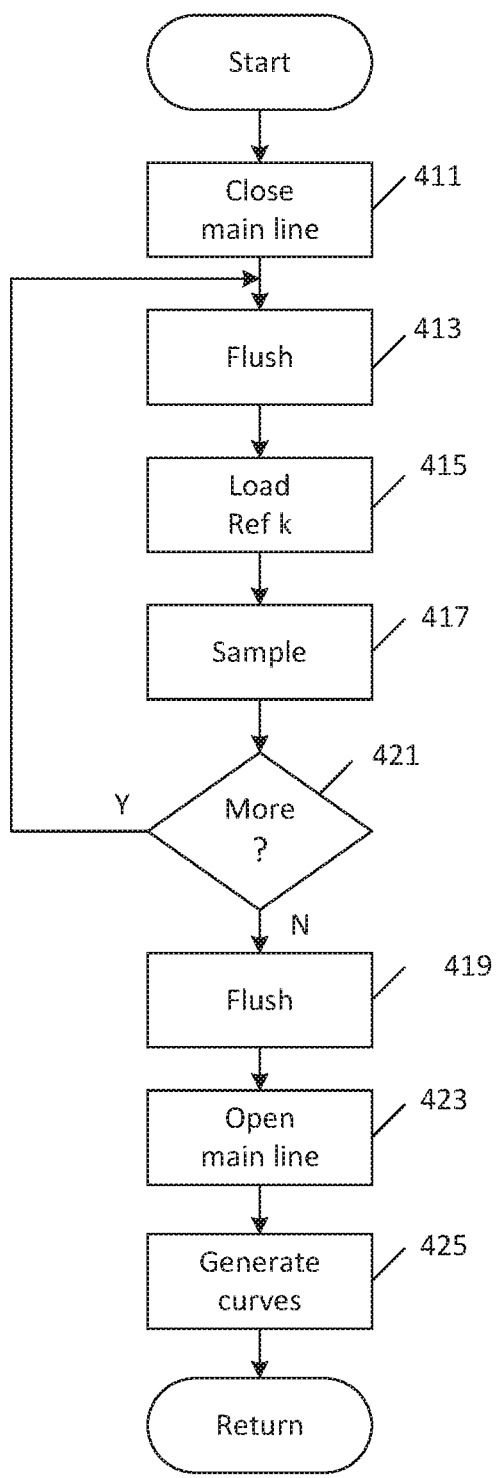
FIG. 4 is a flow diagram of a process for performing sensor calibration in accordance with aspects of the invention.

FIG. 4 is a flow diagram of a process for performing sensor calibration in accordance with aspects of the invention. In some embodiments the process is performed using the components of FIG. 3. In some embodiments the process is performed by the system of FIG. 1, for example using the components of FIG. 3. In some embodiments the controller of FIG. 1 generates commands to perform the operations of the process of FIG. 4.

In block 411 the process closes a connection from a main line to the sensors. The main line, for example, may carry a liquid solution intended to be provided to a grow chamber. In some embodiments the connection from the main line is closed by way of operating a valve.

In block 413 the process flushes a flow chamber used for the sensors. In some embodiments the process flushes the flow chamber by opening valves allowing fluid present in the flow chamber to exit the flow chamber. In some embodiments the process flushes the flow chamber by passing a cleansing solution through the flow chamber. In some embodiments the cleansing solution is water. In some embodiments the cleansing solution is an aqueous solution containing one or more of a detergent, chlorine, or some other cleansing solution. In some embodiments the cleansing solution is a reference solution, for example having a known level or levels of particular nutrients. The reference solution, for example, may be a reference solution known to be a next reference solution for use during the calibration process.

In block 415 the process loads the flow chamber with a reference solution. In various embodiments the reference solution is one of a plurality of reference solutions. For example, there may be n reference solutions, n an integer greater than 1, and the loaded reference solution may be considered a reference solution k, k being an integer between 1 and n, inclusive. In some embodiments the reference solution is an aqueous solution with a predetermined level of a nutrient. In some embodiments a plurality of the reference solutions each include a different predetermined level of the nutrient. In some embodiments a plurality of the reference solutions each include different predetermined levels of a plurality of nutrients.

In block 417 the process samples the reference solution in the flow chamber. In some embodiments the sampling is performed using one or more ion sensitive electrodes. In some embodiments the process samples the reference solution using an ion sensitive electrode for a particular ion. In some embodiments the process samples the reference solution using the ion sensitive electrode for the particular ion for a plurality of reference solutions, with in some embodiments ion sensitive electrodes for different particular ions used for different subsets of reference solutions. In some embodiments a plurality of ion sensitive electrodes, each for different particular ions, are used for some or all of the reference solutions.

In block 419 the process determines if there are more reference solutions to be used. If so, the process returns to block 411, flushing the flow chamber and commencing sampling using another reference solution.

Otherwise the process continues to block 421 and flushes the flow chamber. The process thereafter opens the connection to the main line in block 423, allowing for liquid solution intended for the grow chamber to enter the flow chamber and be sensed for nutrient levels by the sensors.

In block 425 the process generates curves relating sensor output to nutrient levels for each of the sensors. In some embodiments the process uses at least three sensor readings for different ion levels, and generates a curve of ion concentration vs. sensor readings for each ion sensed by a sensor. In some embodiments the curve has a constant slope, in some embodiments the curve has a second order slope, and in some embodiments the curve has piecewise linear slopes.

The process thereafter returns.

Figure 5:
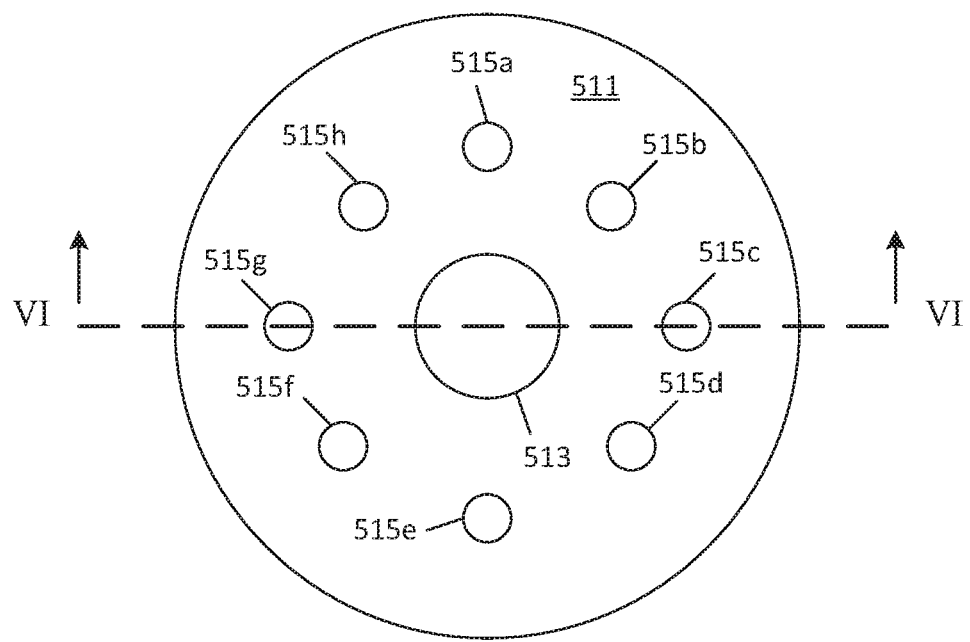
FIG. 5 is a top view of a representation of an embodiment of a flow chamber in accordance with aspects of the invention.

FIG. 5 is a top view of a representation of an embodiment of a flow chamber in accordance with aspects of the invention. In some embodiments the flow chamber of FIG. 5 may be used as the flow chamber of FIG. 3.

The flow chamber includes a generally circular upper surface 511. An inlet port 513 is present on the upper surface, approximately at a center of the upper surface in the embodiment of FIG. 5. A plurality of ion sensitive electrodes 515a-h extend through the upper surface and into the flow chamber. The embodiments of FIG. 5 includes 8 ion sensitive electrodes, the number of ion sensitive electrodes may differ in different embodiments. In many embodiments, each of the ion sensitive electrodes are for sensing levels of different ions in a solution. In some embodiments there may be redundancy for some or all of the ions, and some of the ion sensitive electrodes may be for the same ion.

Figure 6:
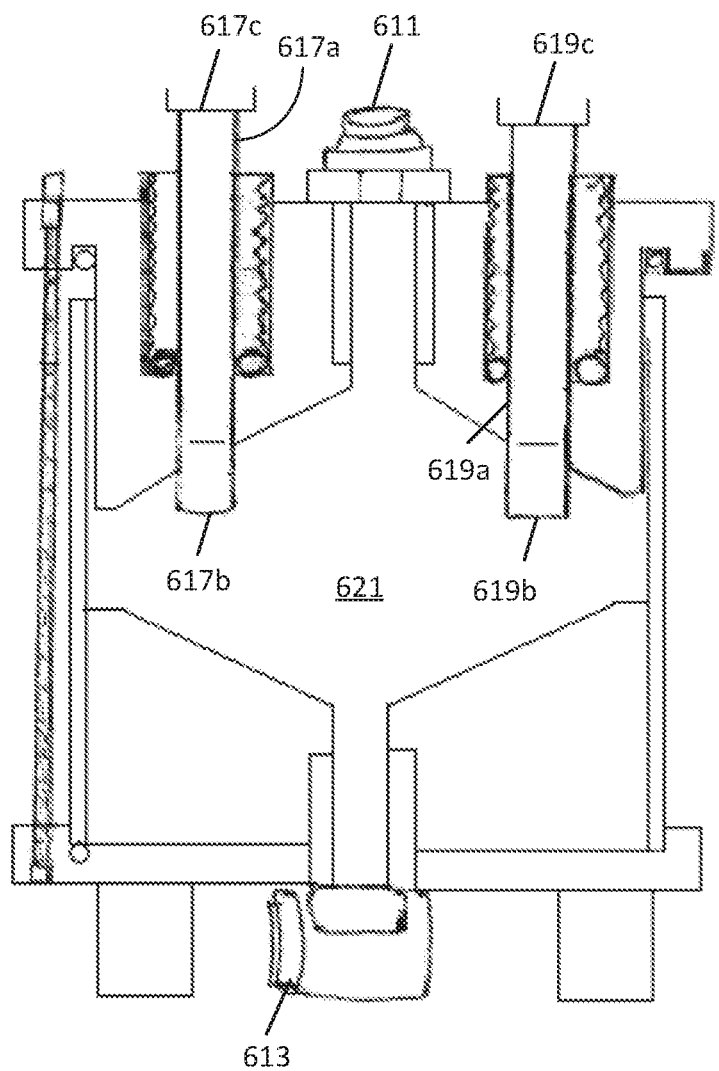
FIG. 6 is a cross-sectional view of a representation of an embodiment of a flow chamber.

FIG. 6 is a cross-sectional view of a representation of an embodiment of a flow chamber, for example along the section VI-VI of the embodiment of FIG. 5. An inlet port 611 on a top of the flow chamber provides for passage of fluid into the flow chamber. A corresponding outlet port 613 is on a bottom of the flow chamber. Interior to the flow chamber, a chamber 621 allows for pooling of the fluid within the flow chamber. In some embodiments pooling of the fluid is encouraged by having a passage to the outlet port of slightly reduced diameter, as compared to a passage from the inlet port.

A plurality of ion sensitive electrode devices are inserted through a top of the flow chamber, with ends protruding into the chamber 621. Visible in FIG. 6 are two such devices. A first device includes a cylinder 617a having a first ion sensitive electrode accessible to the fluid by way of a first membrane 617b, with electrical connections available at a top 617c of the cylinder 617a. Similarly, a second device includes a cylinder 619a having a second ion sensitive electrode accessible to the fluid by way of a second membrane 619b, with electrical connections available at a top 619c of the cylinder 619a. In various embodiments the first membrane and the second membrane are permeable by different ions or cations, such that the first ion sensitive electrode effectively measures a different ion or cation than the second ion sensitive electrode.

Figure 7:
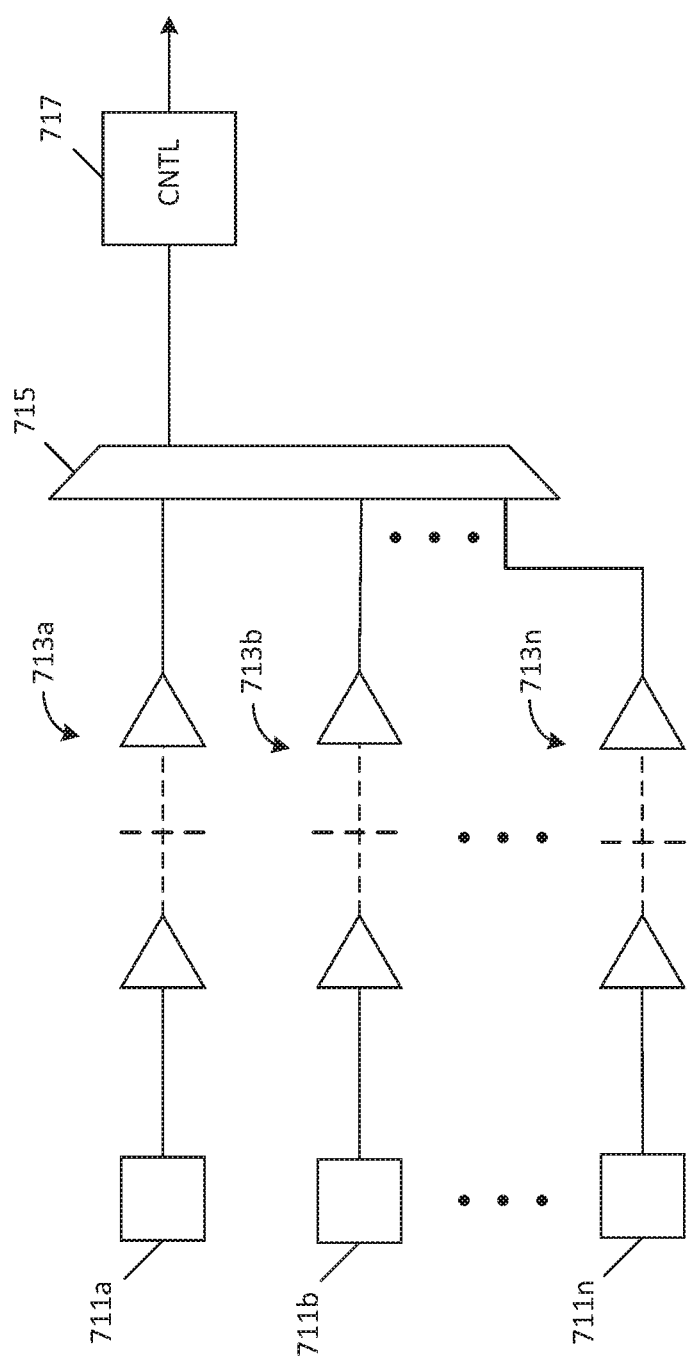
FIG. 7 is a block diagram illustrating portions of an example embodiment of circuitry utilized in measurement of ions or cations, reflecting nutrient levels in the liquid solution.

The ion sensitive electrodes are electrically coupled to circuitry allowing for measurement of the ions or cations. FIG. 7 is a block diagram illustrating portions of an example embodiment of circuitry utilized in measurement of ions or cations, reflecting nutrient levels in the liquid solution. In some embodiments the circuitry of FIG. 7 may be present, for example, in the system of FIG. 1, or a system similar to the system of FIG. 1. In FIG. 7, a plurality of ion sensitive electrodes 711a-n are each coupled to corresponding isolation amplifiers 713a-n. In some embodiments the isolation amplifiers are transformer-isolated isolated amplifiers. Outputs of the isolation amplifiers are provided to a multiplexer, which selectively selects one of its inputs and provides that input to the multiplexer output. In some embodiments the multiplexer is operated in a time-based round robin manner, with successive inputs successively provided to the output. The output is provided to control circuitry. In various embodiments the control circuitry may include an analog-to-digital controller (ADC), for example as may be available in a digital signal processor (DSP), in other embodiments the ADC may be separately provided.

Although the invention has been discussed with respect to various embodiments, it should be recognized that the invention comprises the novel and non-obvious claims supported by this disclosure.

What is claimed is:

1. A nutrient control system for aquaponically grown plants, comprising:
    a grow chamber for aquaponically growing plants;
    a liquid solution line for providing liquid solution to the aquaponically growing plants and for receiving liquid solution from the aquaponically growing plants, so as to recirculate the liquid solution;
    a plurality of nutrient tanks containing nutrients coupled to the liquid solution line;
    a plurality of reference solution tanks containing reference solutions;
    a chamber selectively coupled to the liquid solution line and to the reference solution tanks, the chamber including an inlet port for passage of solution into the chamber and an outlet port for passage of solution out of the chamber, the output port having a reduced diameter compared to a diameter of the inlet port;
    a plurality of sensors for sensing ion levels in solution in the chamber;
    a controller configured to control addition of the nutrients to the liquid solution based on sensed ion levels in solution in the chamber, configured to perform sensor calibration based on sensed ion levels in solution in the chamber, and to selectively couple the chamber to the liquid solution line or to the reference solution tanks; and
    a plurality of isolation amplifiers coupling the plurality of sensors and the controller.

2. The system of claim 1, wherein the controller is further configured to selectively couple the reference solution tanks to the chamber at different times.

3. The system of claim 2, wherein the controller is configured not to perform sensor calibration during times at which the chamber is coupled to the liquid solution time and to perform sensor calibration during times at which the chamber contains at least one reference solution.

4. The system of claim 1, further including a plurality of valves, at least one of the valves for selectively coupling the chamber to the liquid solution line and the reference solution tanks.

5. The system of claim 4, wherein the controller is configured to control the valves.

6. The system of claim 1, wherein the sensors comprise ion sensing electrodes.

7. The system of claim 6, wherein at least some of the ion sensing electrodes are configured to sense different ions.

8. The system of claim 1, wherein different ones of the reference solutions comprise solutions with different levels of ions.

9. The system of claim 8, wherein at least some of the reference solutions comprise solutions with different levels of a plurality of ions.

10. The system of claim 1, wherein at least one of the reference solution tanks contains a cleansing solution.

11. The system of claim 1 wherein the grow chamber includes one or more vertical walls for mounting of plants for aeroponic growth.

12. A method for control of nutrients provided to aquaponically grown crops, comprising:
recirculating a liquid solution containing nutrients through an aquaponic grow chamber;
sensing levels of a plurality of ions in the liquid solution containing nutrients using a plurality of sensing devices having portions immersed in a single chamber, the single chamber having an inlet port and an outlet port, the outlet port having a reduced diameter compared to a diameter of the inlet port, the sensing devices coupled to a controller by isolation amplifiers;
determining, by the controller, that at least one of the sensing devices indicates a selected ion level below a predetermined selected ion level;
responsive to the determination that at least one of the sensing devices indicates the selected ion level below the predetermined selected ion level, commanding, by the controller, an increase in a selected nutrient;
responsive to the command by the controller to increase the selected nutrient, increasing a quantity of the selected nutrient in the liquid solution containing nutrients;
providing a plurality of reference solutions to the single chamber, each of the plurality of reference solutions being provided to the single chamber at different times;
sensing levels of the plurality of ions in the reference solutions using the plurality of sensing devices; and
generating calibration curves for the sensing devices, by the controller, using indications of the sensed levels of the plurality of ions in the reference solutions.

13. The method of claim 12, further comprising controlling a plurality of valves to control provision of the liquid solution containing nutrients or the reference solutions to the single chamber.

14. The method of claim 13, wherein the controller controls the plurality of valves.

15. The method of claim 12, wherein at least some of the reference solutions contain different predetermined levels of the same ion.

16. The method of claim 12, wherein at least some of the reference solutions contain different predetermined levels of a plurality of ions.

17. The method of claim 12, wherein the sensors comprise ion selective electrodes.

18. The method of claim 17, wherein at least some of the ion selective electrodes are configured to sense levels of different ions.

19. The method of claim 18, wherein at least some of the ion selective electrodes are configured to sense levels of a same ion.

* * * * *